April 26, 1955 J. H. SWARTZ ET AL 2,707,118
BALANCED PRESSURE SEAL
Filed Nov. 18, 1952
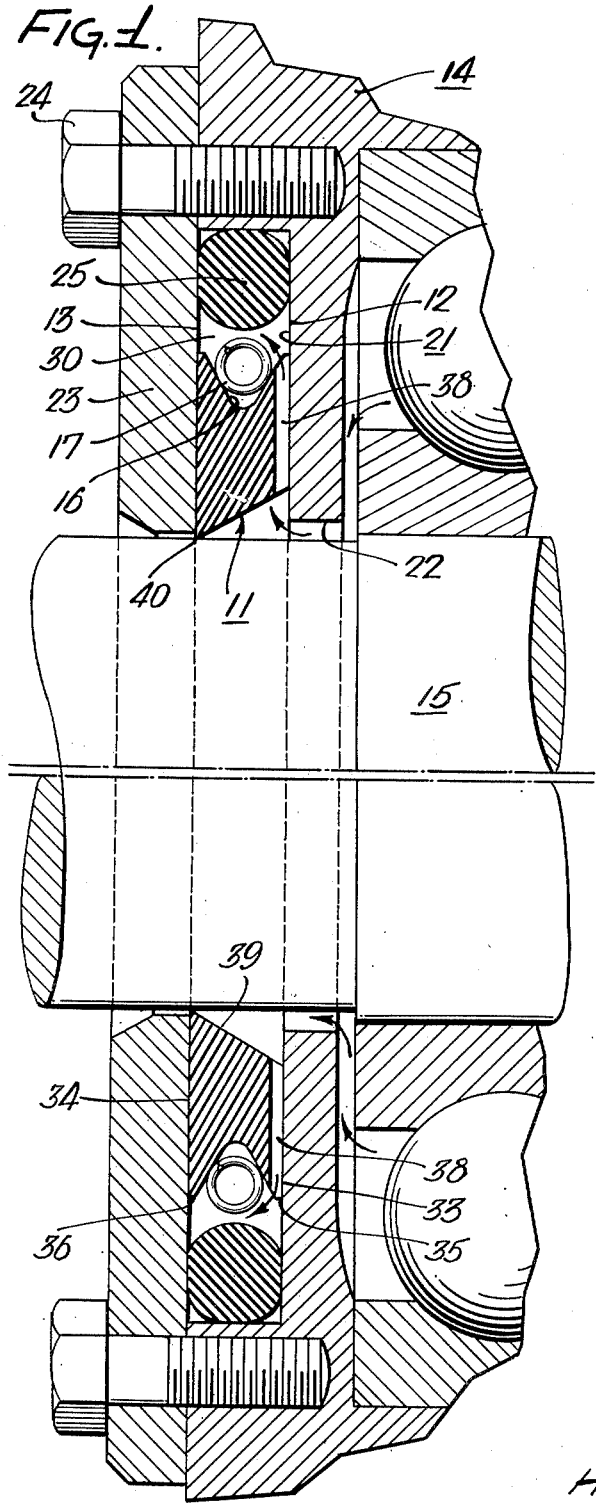
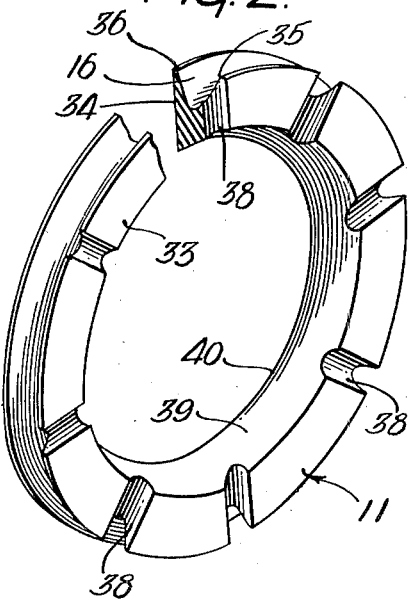
Inventors:
John H. Swartz
Howard M. Purcell
by their Attorneys
Howson & Howson

2,707,118

BALANCED PRESSURE SEAL

John H. Swartz, Ardmore, and Howard M. Purcell, Lansdowne, Pa., assignors to Linear, Incorporated, Philadelphia, Pa., a corporation of Pennsylvania Application November 18, 1952, Serial No. 321,194

5 Claims. (Cl. 286—11.16)

The present invention relates to improvements in pressure seals for rotary shafts and other movable members and more particularly to seals of this type having resilient means for compressing or expanding the sealing element against the movable member.

Prior to the present invention, pressure seals have been provided with means to admit pressure fluid behind the sealing element so that the fluid contributes to the force urging the element into engagement with the rotary shaft or other movable member. If the pressure is sufficiently high, however, the sealing element is unduly compressed against the shaft and the frictional resistance to the relative rotary motion of the element and the shaft causes a substantial amount of frictional heat to be generated. This heat not only is wasteful of energy but also contributes to the deterioration of the sealing material which composes the element. In addition, the element must be of substantial dimensions in order to withstand the hard usage occasioned by the excess force of the pressure fluid. It is necessary, therefore, to provide for an enlarged casing to accommodate the larger sized element when designing the housing for the shaft. The increase in the size of the housing adds to the cost of the assembly as well as increasing its weight and bulk.

In addition, prior pressure fluid seals of this character are not efficient for sealing against pressures which fluctuate greatly, because as the fluid pressure varies, the force engaging the sealing member against the shaft is changed proportionally due to the fact that the pressure fluid behind the seal constitutes a major part of this force. This fluctuation in sealing force causes a similar fluctuation in the load on the shaft occasioned by the frictional drag of the sealing element which is proportional to the force acting on the seal.

With the foregoing in mind, a primary object of the invention, therefore, is to provide a seal of balanced pressure design wherein the force of the sealing element against the shaft or other rotary member is substantially independent of the applied fluid pressure, and is dependent principally upon the force of a resilient mounting means.

A further object of the present invention is to provide a seal which is characterized by its low frictional drag and consequently is free from the deteriorating effects of frictional heat, the seal being of small dimensions so as to be applicable in a confined space.

More specifically, the invention contemplates a seal whose inner and outer peripheral surfaces are both exposed to the applied fluid pressure, and are substantially equal in effective area, one of the the peripheral surfaces being adapted to receive a resilient mounting element for engaging the sealing element with the rotary member.

These, and other objects of the invention and the various features and details of the construction and operation thereof are more fully set forth hereinafter with reference to the accompanying drawing, in which:

Fig. 1 is a longitudinal sectional view of an assembly embodying a sealing element made in accordance with the present invention; and, Fig. 2 is a perspective view of the sealing element of Fig. 1 with a portion broken away to more clearly illustrate its construction.

Referring to the drawing, the illustrated embodiment of the present invention comprises a thin annular element 11 of rubber or other suitable resilient sealing material which is adapted to be interposed between the interior and exterior walls 12 and 13 respectively of a casing 14 and to engage a cylindrical shaft 15 mounted for rotation in the casing. The sealing element is formed with a continuous V-groove 16 about its outer peripheral surface, which seats a tension device 17 which in the present instance comprises a garter spring, i. e., an elongated coil spring, the ends of which are united to form a closed loop. The spring 17 wedges itself into the groove, the inwardly directed compressive force of the tensioned spring spreading the walls of the groove 16 to bias the side faces of the element 11 outwardly into close engagement with the walls 12 and 13 of the casing. The spring 17 also compresses the body of the element 11 radially inward into sealing engagement with the shaft 15, as described more fully hereinafter.

The seal of the present invention is especially suitable for sealing shafts within housings containing a pressure fluid such, for example, as pressurized oil or the like. In accordance with the invention, both the inner and outer peripheral surfaces of the element 11 are of equal effective area and are exposed to the pressure fluid so that the radial forces exerted by the fluid on the element are balanced out. The force of the sealing element 11 on the shaft 15 is, therefore, substantially independent of the pressure of the fluid confined in the casing 14. The fluid pressure does, however, contribute to the force which seals the element against the exterior wall 13 of the casing, and, therefore, eliminates the need for extraneous sealing material such as cement, shellac, or the like.

In accordance with the invention, the casing is formed to provide spaced-apart interior and exterior walls 12 and 13 respectively. In the present instance, the interior wall 12 is formed integrally with the casing 14 as the side face of an annular recess 21 formed in the casing in immediate proximity to the shaft 15. The interior wall 12, therefore, surrounds the shaft with a predetermined clearance, as indicated at 22 in Fig. 1. The recess 21 in the casing 14 is adapted to be closed by an annular end plate 23 which is removably secured to the casing, for example, by bolts 24. The plate 23 closely embraces the shaft 15 with small clearance and its interior side face constitutes the exterior radial wall 12 of the casing. The recess 21 is formed as illustrated, so that when the plate 23 is clamped to the casing 14, the element 11 seats securely in the recess between the walls 12 and 13. The outer peripheral edge of the recess is sealed against the escape of pressure fluid, for example, by an O-ring 25 held in compression within the recess 21 by the end plate 23. It is to be noted that the O-ring 25 is spaced outwardly from the element 11 so as to define between the element and the ring an annular space 30, for a purpose set forth more fully hereinafter.

In the preferred form of the invention, the element is composed of rubber or other resilient flexible sealing material, and is relatively thin, its axial length corresponding to the depth of the recess 21 so that the interior and exterior side faces 33 and 34 respectively of the element 11 seat nicely against the walls 12 and 13 as illustrated in Fig. 1. The outer peripheral surface of the element is formed with the V-groove 16, the angular sides of which terminate adjacent the side faces 33 and 34 to form readily displaceable lips 35 and 36 respectively. The groove 16 receives the garter spring 17 and the side walls of the groove converge in an acute angle so that the tensioned spring wedges into the groove and tends to spread the lips 35 and 36 into firm engagement with the walls 12 and 13 respectively. The spring will also tend to compress the body of the element radially inward against the cylindrical member 15 as described more fully below.

In accordance with the invention, means is provided to admit pressure fluid to the outer peripheral surface of the element. To this end, the interior side face 33 of the element 11 is formed with a plurality of radially extending semi-circular passages or ducts 38 which are equally spaced circumferentially about the face 33, as clearly illustrated in Fig. 2. With reference to Fig. 1 and the arrows which indicate the fluid path in the assembly, it will be seen that the pressure fluid will readily pass through ducts 38 into the space 30 which surrounds the sealing element 11. Thus, the outer peripheral surface of the element 11 is exposed to the pressure fluid which is confined within the casing 14. The ducts 38 are also exposed to the pressure fluid and its pressure therein will bias the element 11 against the opposite side wall 13.

The exterior side face 34 of the sealing element is preferably flat so as to seat snugly against the flat exterior wall 13 and insures against the escape of pressure fluid from the space 30. The face 34 terminates at its outer edge in the aforementioned resilient lip 36 which is biased against the side wall 13 by the garter spring 17 to provide a firm seal against the escape of pressure fluid. The spring pressure will be supplemented by the action of the fluid pressure in the ducts 38 in the side face 33 as set forth above. In this manner the two pressures biasing the face 34 against the wall 13, i. e., the spring pressure and the fluid pressure, eliminate the necessity for extraneous sealing matter such as cement, shellac or the like between the wall 13 and the face 34.

In accordance with the invention, the inner peripheral surface 39 of the sealing element 11 is exposed to the pressure fluid and is substantially equal in effective area to the outer peripheral surface defined by the groove 16. To this end, the surfaces 34 and 39 meet in a thin sealing edge or crest 40 about the inner periphery of the element. When the sealing element is in place within the casing 14, the spring 17 will compress the element radially so as to bias the crest 40 into engagement with the cylindrical shaft 15. This engagement will be a line contact as clearly illustrated in Fig. 1.

The novel construction of the pressure seal of the present invention affords an equal balance between the inward and outward radial forces of the pressure fluid on the element. As a result of this balance, the force of the sealing element 11 against the shaft 15 is substantially independent of the pressure within the casing, and is controlled primarily by the tension in the garter spring 17. This tension is constant for any given spring and, consequently, the force on the cylindrical rotary member 15 will similarly be constant. The frictional drag between the member 15 and the sealing element 11 will also be constant, since the friction force varies directly with the radial force of the element against the member.

The reduction in the frictional drag not only is occasioned by the equal effective area of the inner and outer peripheral surfaces and the consequent reduction in the radial force of the element on the rotary member, but also is occasioned by the line contact of the crest 40 against the member 15. The drag is proportional to the area of contact, and by reducing this area to a thin line, the drag is reduced correspondingly.

Because of the reduction in frictional drag on the seal of the present invention, and the consequent improvement in wear resistance, the sealing element may be of small dimensions. The axial thickness is controlled primarily by the axial width of the spring 17 which must nest within the groove 16, and the radial dimension of the element is determined by the ability of the flexible material composing the element to withstand collapse under the tension of the spring. The seal of the present invention is not only economical of labor and materials in the manufacture of the sealing element itself, but it also affords substantial economies in the design of the casing. The space required for the seal is confined to a minimum so that the casing need not be encumbered with a bulky housing for the seal, but may be neat and compact.

A further factor in the economy of the present seal is the elimination of extraneous adhesive for sealing the element 11 to the casing 14. The seal between these members is provided by the displacement of the lip 36 under the influence of the spring 17 and the force of the pressure fluid in the ducts 38 biasing the complete exterior side face 34 of the element against the wall 13. It is to be noted that the end plate 23 of the casing 14 extends into close proximity to the cylindrical member 15 so that a minimum clearance is provided between the two members. This small clearance provides a maximum area of contact between the element 11 and the side wall 13 and in addition reduces to a minimum the possibility of the element 11 being extruded outwardly between the members 14 and 15 by the force of the fluid pressure within the casing.

Although a specific construction has been illustrated and described herein, considerable structural modification is possible within the scope of the invention. For example, the illustrated embodiment of the invention constitutes a seal for a shaft rotating within a stationary housing, but by the reversal and rearrangement of the elements, the seal may be adapted to seal a sleeve rotating about the outside of a stationary member without departure from the invention, as defined in the appended claims.

We claim:

1. In a pressure balanced fluid seal for a movable member, a casing having spaced apart confronting radial walls, one of said walls closely surrounding said movable member and the other of said walls surrounding said member with a predetermined clearance, a sealing element comprising an annular continuous resilient member interposed between said walls and surrounding said movable member, said annular member having opposite substantially parallel side faces respectively confronting said walls, one of said faces being exposed to the pressure fluid, the inner peripheral surface of said annular member being tapered inwardly from said one side face in the direction of said one wall at least substantially to the other side face of the member to provide at the inner periphery of said member a continuous thin crest of reduced axial dimension for sealing engagement with the surface of said movable member, the outer peripheral surface of said annular member having a continuous groove therein providing at the outer edges of the opposite side faces of said annular member spaced substantially continuous lip portions displaceable laterally with respect to the normal planes of said side faces, resilient means in said groove operable to displace said lip portions laterally into firm engagement with said radial walls and to bias the said crest at the inner periphery of said annular member inwardly into continuous sealing engagement with said movable member, and means providing pressure fluid communication between said inner and outer peripheral surfaces of said annular member, said peripheral surfaces being of substantially equal effective circumferential area so as to substantially counterbalance the inward and outward radial forces of said pressure fluid on said sealing element.

2. In a pressure balanced fluid seal for a movable member, a casing having spaced apart confronting radial walls, one of said walls extending closely adjacent said movable member and the other of said walls having a predetermined clearance therewith, a sealing element comprising an annular continuous resilient member interposed between said walls and extending adjacent said movable member, said annular member having opposite substantially parallel side faces respectively confronting said walls, one of said faces being exposed to the pressure fluid, one peripheral surface of said annular member being tapered from said one side face in the direction of said one wall at least substantially to the other side face of the member to provide at the one periphery of said member a continuous thin crest of reduced axial dimension for sealing engagement with the surface of said movable member, the other peripheral surface of said annular member having a continuous groove therein providing at the other peripheral edges of the opposite side faces of said annular member spaced substantially continuous lip portions displaceable laterally with respect to the normal planes of said side faces, resilient means in said groove operable to displace said lip portions laterally into firm engagement with said radial walls and to bias the said crest at the one periphery of said annular member into continuous sealing engagement with said movable member, and means providing pressure fluid communication between said peripheral surfaces of said annular member, said peripheral surfaces being of substantially equal effective circumferential areas so as to substantially counterbalance the inward and outward radial forces of said pressure fluid on said sealing element.

3. In a pressure balanced fluid seal for a movable member, a casing having spaced apart confronting radial walls, one of said walls closely surrounding said movable member and the other of said walls surrounding said member with a predetermined clearance, a sealing element comprising an annular member interposed between said walls and surrounding said movable member, said annular member having opposite substantially parallel side faces respectively confronting said walls, one of said faces being exposed to the pressure fluid, the inner peripheral surface of said annular member being tapered inwardly from said one side face in the direction of said one wall at least substantially to the other side face of the member to provide at the one periphery of said member a continuous thin crest of reduced axial dimension for sealing engagement with the surface of said movable member, means operable on the outer peripheral surface of said annular member to bias the said other side face into sealing engagement with said one wall and to bias the said crest at the inner periphery of said annular member inwardly into continuous sealing engagement with said movable member, and means providing pressure fluid communication between said inner and outer peripheral surfaces of said annular member, said peripheral surfaces being of substantially equal effective circumferential areas so as to substantially counterbalance the inward and outward radial forces of said pressure fluid on said sealing element.

4. In a pressure balanced fluid seal for a movable member, a casing having spaced apart confronting radial walls, one of said walls closely surrounding said movable member and the other of said walls also surrounding said member, a sealing element comprising an annular member interposed between said walls and surrounding said movable member, said annular member having opposite substantially parallel side faces respectively confronting said walls, one of said faces being exposed to the pressure fluid, the inner peripheral surface of said annular member being tapered inwardly from said one side face in the direction of said one wall at least substantially to the other side face of the member to provide at the inner periphery of said member a continuous thin crest of reduced axial dimension for sealing engagement with the surface of said movable member, means operable to bias the said crest at the inner periphery of said annular member inwardly into continuous sealing engagement with said movable member, and means providing pressure fluid communication between said inner and outer peripheral surfaces of said annular member, said peripheral surfaces being of substantially equal effective circumferential areas so as to substantially counterbalance the inward and outward radial forces of said pressure fluid on said sealing element.

5. In a pressure balance fluid seal for a rotary member, a casing having spaced apart confronting radial walls, one of said walls closely surrounding said rotary member and the other of said walls surrounding said member with a predetermined clearance, a sealing element comprising a thin continuous annular member of resilient flexible material interposed between said walls and surrounding said rotary member, said annular member having opposite substantially parallel side faces respectively confronting said walls, one of said faces being exposed to the pressure fluid, the inner peripheral surface of said annular member being tapered inwardly from said one side face in the direction of said one wall at least substantially to the other side face of the member to provide at the inner periphery of said member a continuous thin crest of reduced axial dimension for sealing engagement with the surface of said rotary member, the outer peripheral surface of said annular member having a continuous V-groove therein providing at the outer peripheral edges of the opposite side faces of said annular member spaced substantially continuous lip portions displaceable laterally with respect to the normal planes of said side faces, a garter spring wedged in said groove operable to displace said lip portions laterally into firm engagement with said radial walls and to bias the said crest at the inner periphery of said annular member inwardly into continuous sealing engagement with said rotary member, and a plurality of radially extending ducts spaced circumferentially about the said one side face providing pressure fluid communication between said inner and outer peripheral surfaces of said annular member, said peripheral surfaces being of substantially equal effective circumferential areas so as to substantially counterbalance the inward and outward radial forces of said pressure fluid on said sealing element.

References Cited in the file of this patent
UNITED STATES PATENTS

| Number | Name | Date |
|---|---|---|
| 1,338,955 | Parsons et al. | May 4, 1920 |
| 1,425,268 | Massa | Aug. 8, 1922 |
| 2,100,113 | Travis | Nov. 23, 1937 |
| 2,326,489 | Payne | Aug. 10, 1943 |
| 2,538,683 | Guiler et al. | Jan. 16, 1951 |
| 2,542,141 | Horton | Feb. 20, 1951 |